Nov. 15, 1938.  G. FISHER  2,136,737
HAIR WAVING PAD WRINGER
Filed Aug. 2, 1937  2 Sheets-Sheet 1
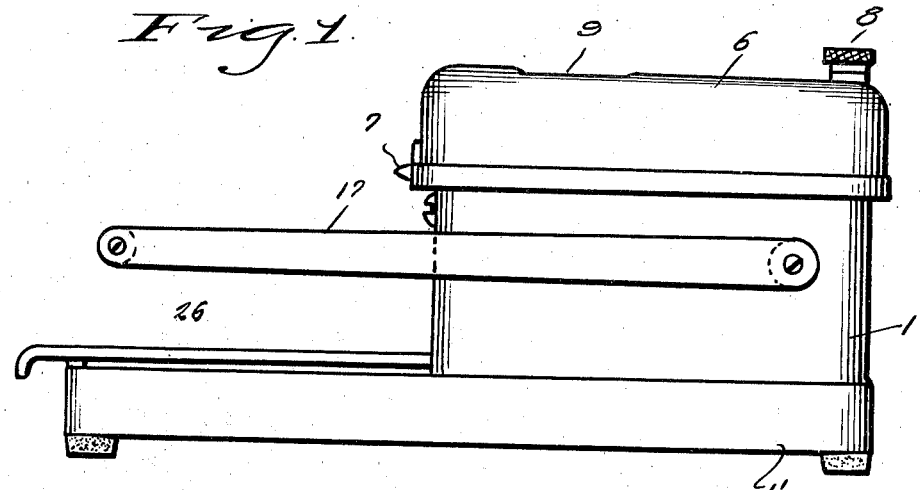
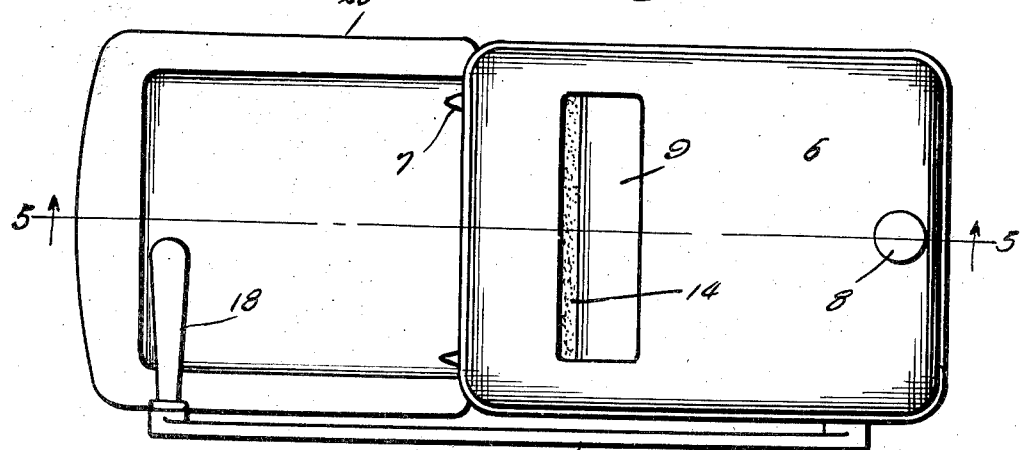
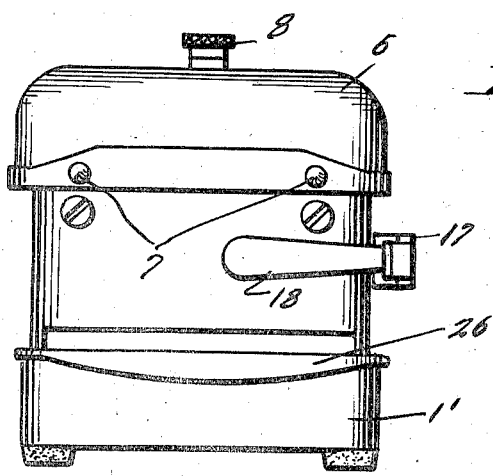
Inventor
Glenn Fisher
By Clarence A. O'Brien
Hyman Berman
Attorneys

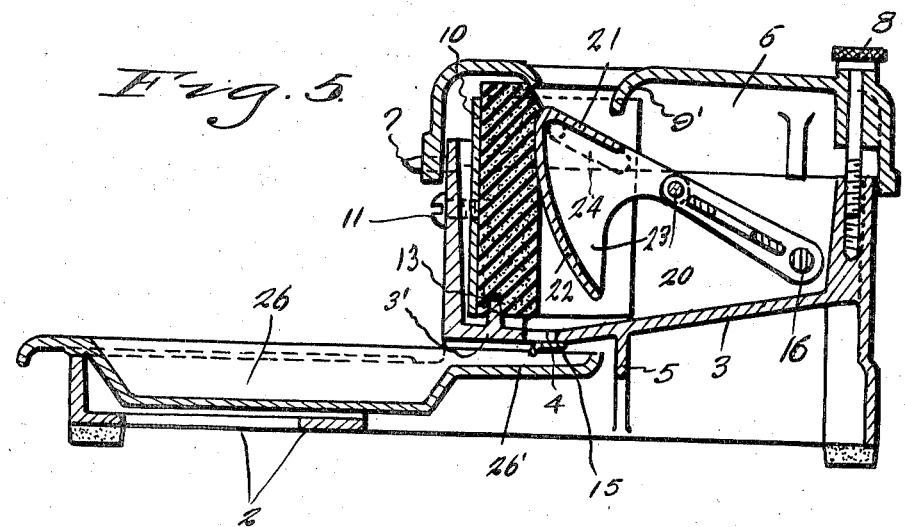
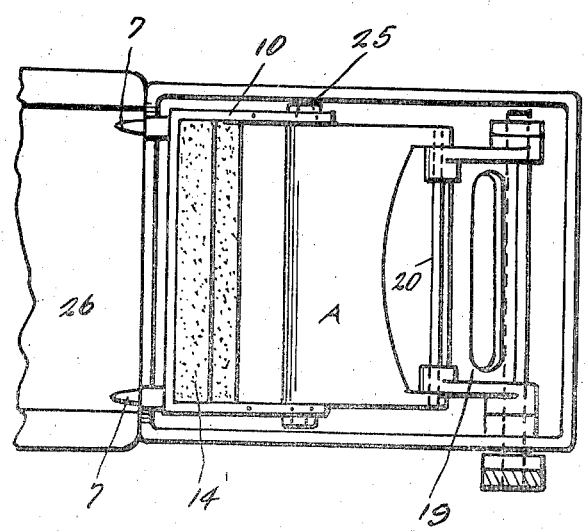
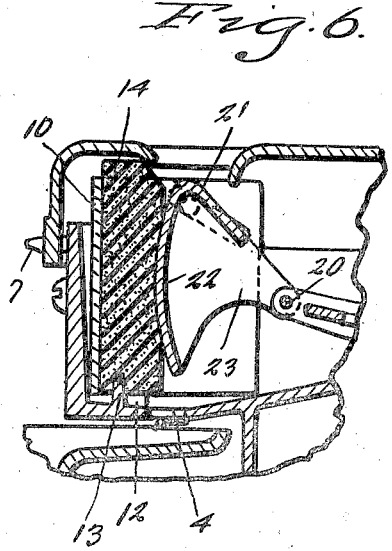

Patented Nov. 15, 1938

2,136,737

UNITED STATES PATENT OFFICE 2,136,737

HAIR WAVING PAD WRINGER

Glenn Fisher, Bowling Green, Ky.

Application August 2, 1937, Serial No. 157,056

5 Claims. (Cl. 68—241)

This invention relates to a device for removing surplus lotion from pads or sachets used in waving hair, the present invention being an improvement over that shown in the subject matter of an application filed by me on February 24, 1937, Serial No. 127,568, now abandoned.

The object of the invention is to provide a casing having pressing means therein for pressing surplus liquid or lotion from the pads upon manipulation of an exterior handle, the casing having a slot therein for the introduction of the pads to the pressing means and said casing having a front extension supporting a bowl which serves the double purpose of collecting the liquid pressed from the pads and also as a container for the pads while the lotion is being poured over them.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of the invention.

Figure 2 is a top plan view thereof.

Figure 3 is a front view of the device.

Figure 4 is a fragmentary top plan view with the cover of the casing removed.

Figure 5 is a section on the line 5—5 of Figure 2.

Figure 6 is a fragmentary longitudinal sectional view showing the presser member in a different position from that shown in Figure 5.

In these drawings, the numeral 1 indicates a casing which is formed with a lower part 1' which extends well in front of the casing and the front part of the extension is formed with a frame 2 at its bottom. The lower end of the front wall of the casing is spaced slightly above the upper edge of the extended part of the portion 1' and the casing is formed with a downwardly and forwardly sloping bottom part 3 terminating in a substantially straight part 3' and a slot 4 is formed in the bottom at approximately the point where the sloping part joins the straight part. A reinforcing web 5 extends across the intermediate portion of the casing below the bottom and is formed with the bottom 3 and said bottom is located above the part 1'.

A cover 6 is provided for the casing and the front of the casing carries the pins 7 which pass through holes in the front part of the cover and a long screw 8 is rotatably supported by the rear part of the cover and fits in a threaded socket in the rear of the casing, the pins and this screw holding the cover to the casing. The cover has a transverse slot 9 in its front part, the walls of which curve downwardly as shown at 9'.

A substantially U-shaped frame 10 is located in the front part of the casing with its bight arranged adjacent to and paralleling the front wall of the casing and its legs extending rearwardly adjacent the side walls of the casing. This member 10 can be held in place by any suitable means though the drawings show it fastened to the front wall of the casing by the screws 11. As will be seen this member extends well into the cover 6 which is of cap shape and overlaps portions of the top part of the casing.

Flat longitudinally extending ribs 12 are formed on the upper face of the part 3' of the bottom and transverse V-shaped ribs 13 are formed on said bottom and these ribs support a block 14 of rubber or the like which has a groove in its lower edge for receiving the ribs 13 which prevents the block from slipping out of place. The upper end of the block has its outer corner beveled as shown and said end extends above the member and close to a part of the cover. The pressing face of the block is located over the slot 4 and a lip forming member 15 is connected to the lower face of the bottom part 3 of the casing and extends partly across the slot, as shown in Figure 5.

A shaft 16 is supported for rocking movement in the casing adjacent the rear thereof and one end of the shaft extends through a side wall of the casing where it has attached thereto a long handle 17 which has a handle grip 18 on its free end. A lever frame 19 is connected with the shaft and a presser member A is pivotally connected with the lever frame by a pin 20. The member A includes a substantially flat part 21 and a slightly arcuate part 22 which extends downwardly at substantially right angles from the part 21, the junction of the two parts being rounded as shown. Substantially triangular-shaped end pieces 23 connect the parts 21 and 22 together at their ends and each end piece is formed with an extension which receives the end of the pin 20. The legs of the frame 10 are formed with the downwardly and rearwardly sloping slots 24 which receive the headed projections 25 carried by the end pieces 23 adjacent the junction of the members 21 and 22.

A bowl 26 is adapted to fit in the front extension and said bowl has a shallow part 26' which extends under the front part of the casing and under the slot 4 for receiving the liquid pressed out of the pads by the device and such liquid flows down the bottom and through the slot 4 and across the lip forming member 15.

The pads can be placed in the bowl and the lotion poured over them and then the pads are inserted into the casing through the slot 9, it being understood that the pads are provided with pieces of tinfoil or the like which can be used for holding the pads as they are being saturated with the lotion and for holding the pads in suspended condition in the casing. Before the pads are placed through the slot 9 the handle is moved to a vertical position and when this has been done the member 19 will be in raised position and this will draw the presser member A rearwardly and as the pins pass along the slots 24 the member A will be moved downwardly and thus said member will be spaced from the block of resilient material as shown in Figure 4. This will permit the pads to be placed between said block and the presser member. Then the handle is moved downwardly and forwardly which will swing the lever 19 downwardly and as it moves downwardly it will force the member A forwardly which causes the projections 25 to ride upwardly in the slot 24 and this will press the upper part of the portion 22 of the member A against the top parts of the pads held in the casing. Further movement of the handle will then cause the lever to start to swing the rear ends of the end members 23 rearwardly which will cause portion 22 to press the pads against the block and this action will continue until the handle is in fully lowered position, with the projections 25 in the rear ends of the slots 24 and the lower part of the portion 22 pressing against the pads. Then the handle is moved upwardly which again subjects the pads to the pressing action of the part 22 and at the end of this action the presser member is moved away from the pads so that the pads can be removed.

As will be seen from Figures 5 and 6 the member 22 has a rolling action on the pads from top to bottom and then from the bottom to the top.

Thus it will be seen surplus lotion is pressed from the pads without the use of the hands of the operator and due to the fact that the operator can carry the pads by the sheets of tinfoil or the like attached thereto, there is no necessity for the operator placing her hands on the pads or in the lotion.

It is thought from the foregoing description that the advantages and novel features of the invention will be readily apparent.

It is to be understood that changes may be made in the construction and in the combination and arrangement of the several parts, provided that such changes fall within the scope of the appended claims.

Having described the invention, what is claimed as new is:—

1. A wringer of the class described comprising a casing, a vertically arranged block of resilient material located in the casing, a shaft journaled in the casing, a lever connected with the shaft, a presser member pivotally connected with the lever and including a forwardly extending part terminating in an arcuate-shaped vertically arranged member, the convex face of which is arranged to press material against the resilient block, diagonal guide means in the casing and the member having projections at its ends engaging the guide means and means for rocking the shaft.

2. A wringer of the class described comprising a casing, a vertically arranged block of resilient material located in the casing, a shaft journaled in the casing, a lever connected with the shaft, a presser member pivotally connected with the lever and including a forwardly extending part terminating in an arcuate-shaped vertically arranged member, the convex face of which is arranged to press material against the resilient block, diagonal guide means in the casing and the member having studs at its ends engaging the guide means, for rocking the shaft, said casing having a cover and a slot in the cover for the introduction of the pads.

3. A device for pressing liquid from articles comprising a casing, a bowl supported in front of the casing with a part of the bowl passing under the casing, the bottom of the casing having a slot therein located above said part of the bowl for draining liquid in the casing into the bowl, a cover for the casing having a slot therein, a resilient block in the casing, a presser member for pressing articles placed in the casing, through the slot in the cover, against the resilient block and means for operating the presser member.

4. A wringer of the class described comprising a casing, a vertically arranged frame in the casing provided with a front part and side parts, said parts having slots therein sloping downwardly and rearwardly, a block of resilient material in the frame and engaging the front part thereof, a shaft supported for rocking movement in the rear part of the casing, a handle connected with the shaft, a lever having one end connected with the shaft and its other end extending forwardly, a presser member including a substantially flat top part, an arcuate front part, the convex face of which contacts the block, and end pieces having rearwardly extending parts which are pivoted to the front end of the lever and projections on the end pieces engaging the slots in the side parts of the frame.

5. In a device of the class described supporting means, a vertically arranged block of resilient material carried by said means, a presser member having a convexed front face engaging the block and end parts extending rearwardly from the front portion, a rock shaft supported by the supporting means, a lever having one end connected with the shaft, means for pivotally connecting the other end of the lever to the rear ends of said end pieces and downwardly and rearwardly sloping guides in the supporting means and said end pieces having projections engaging such guiding means and means for rocking the shaft.

GLENN FISHER.